Jan. 25, 1938.   C. V. McBROOM   2,106,303
MOTOR HORN
Filed May 13, 1936   3 Sheets-Sheet 3
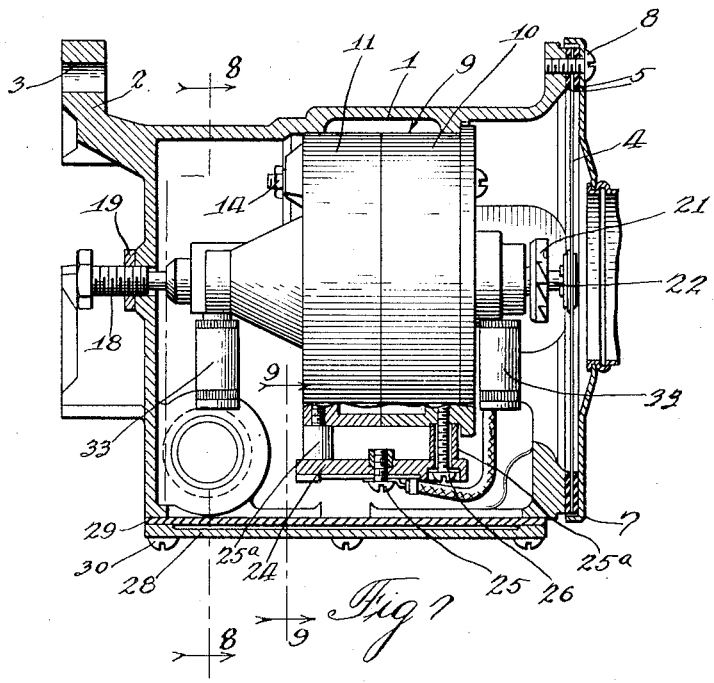
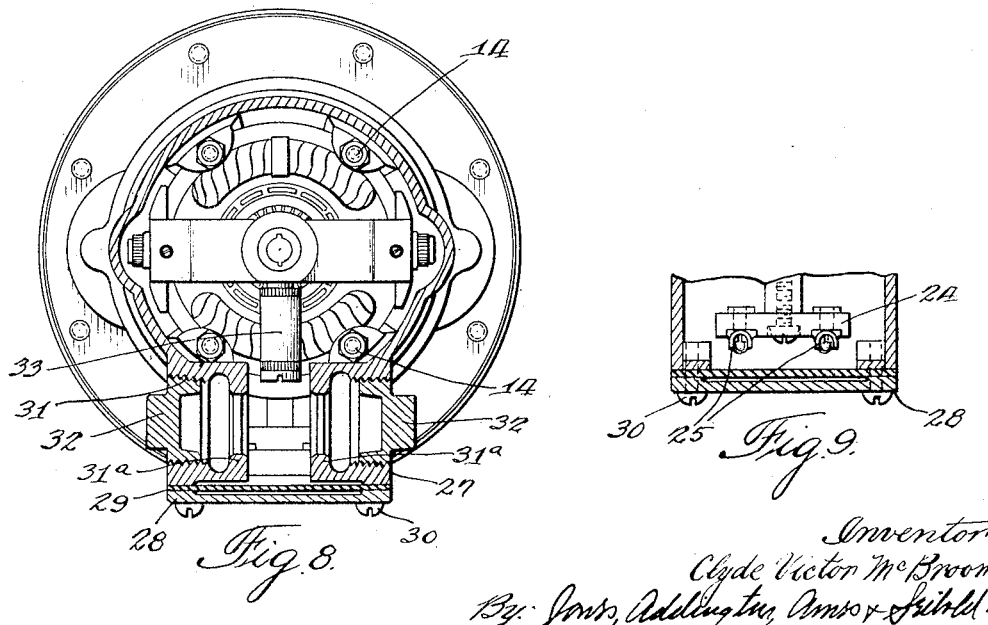
Inventor
Clyde Victor McBroom
By Jones, Addington, Ames & Seibold
Attys.

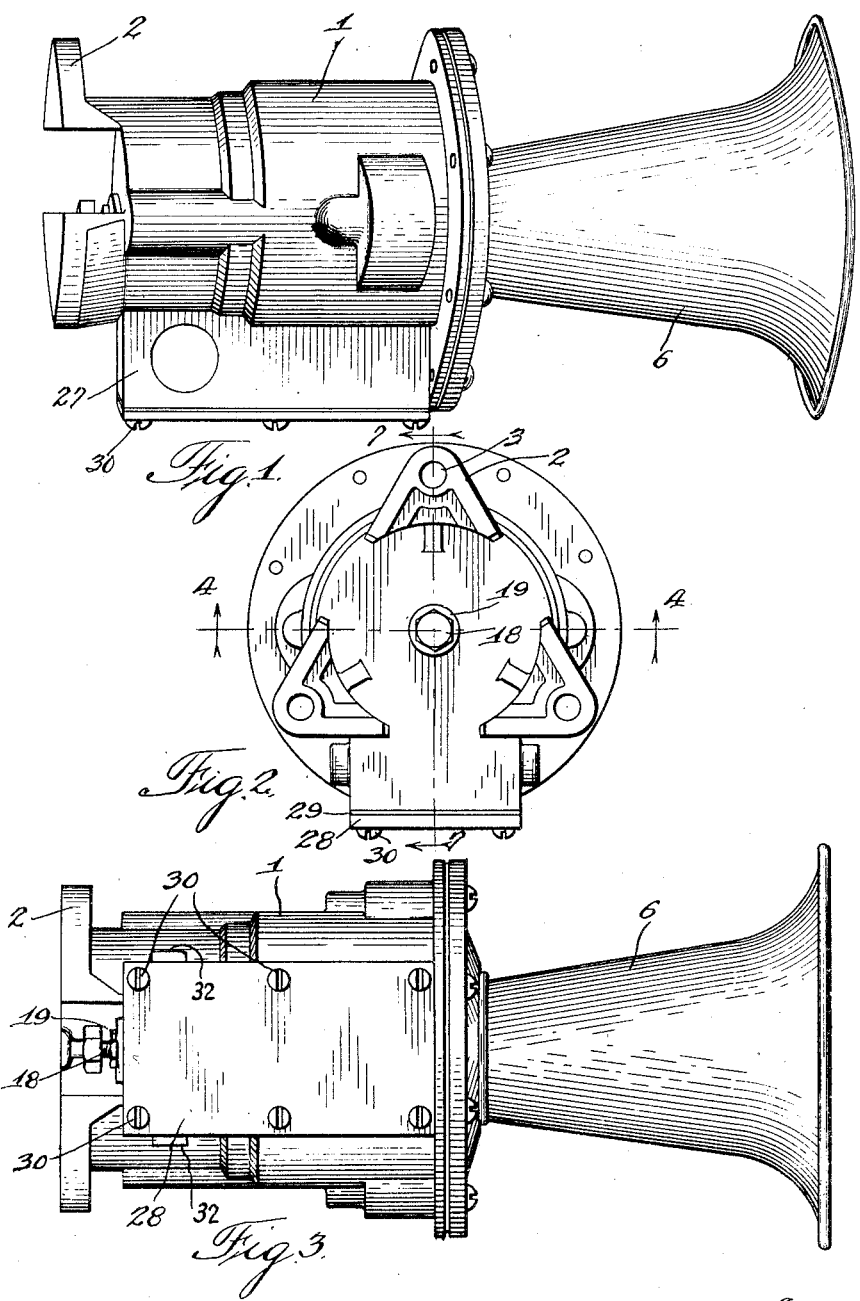

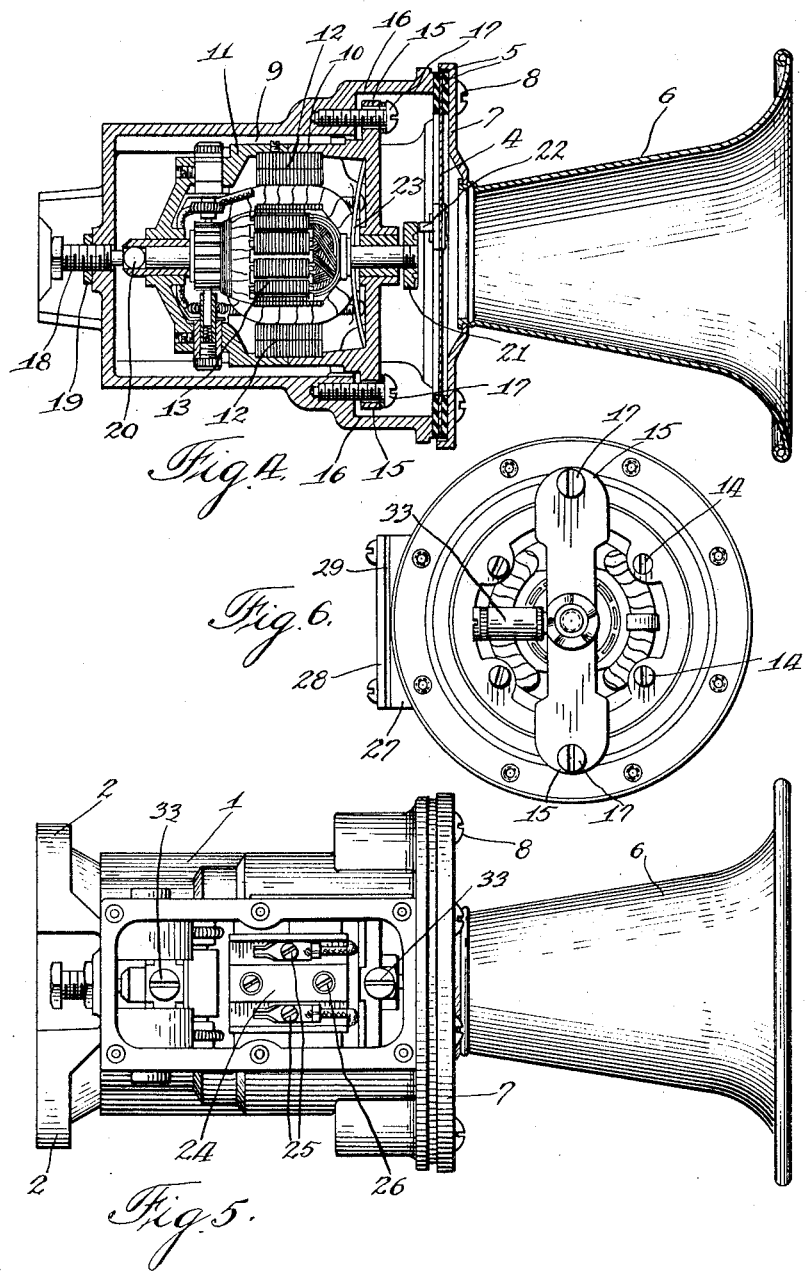

Patented Jan. 25, 1938

2,106,303

UNITED STATES PATENT OFFICE 2,106,303

MOTOR HORN

Clyde Victor McBroom, Des Plaines, Ill., assignor to Benjamin Electric Mfg. Company, Des Plaines, Ill., a corporation of Illinois Application May 13, 1936, Serial No. 79,440

4 Claims. (Cl. 177—7)

This invention relates to signal devices and more particularly to so-called motor driven horns in which the signal is produced by means of a diaphragm vibrated at a desired frequency by means of a suitable electric motor.

The invention is directed to a weatherproof signalling device having particularly advantageous structural features whereby it may be easily manufactured and assembled and whereby the motor may be easily removed and replaced without dismounting the housing from its support.

It is also an object of the present invention to provide a construction in which the wiring terminals and the lubrication cups of the motor are easily accessible by the mere removal of a single cover plate. Heretofore, when it was desired to repair a motor in a device of the type of the present invention, it has been necessary to dismount the entire device and disassemble it in order to make the desired repairs. In the present invention it is merely necessary to remove the projector and diaphragm associated therewith and the motor may then be easily removed from the housing and be replaced by a new motor while the old one is being repaired.

A further object is the production of a motor horn signalling device of the character described which is particularly adapted for rough usage and may be rigidly mounted on a suitable support and in which all parts are easily accessible for repair and adjustment and in which a minimum number of parts and securing means are used.

Further objects will be apparent from the specification and the appended claims.

In the drawings:

Figure 1 is a side perspective view of one embodiment of the invention.

Fig. 2 is a rear end elevation of the embodiment illustrated in Fig. 1.

Fig. 3 is a bottom view of the unit illustrated in Fig. 1.

Fig. 4 is a longitudinal sectional view taken on a line substantially corresponding to line 4—4 of Fig. 2.

Fig. 5 is a bottom view of the embodiment illustrated in Fig. 1 with the cover plate removed to provide access to the wiring terminals and the wick oilers.

Fig. 6 is a front view of the embodiment as illustrated in Fig. 4 with the projector and diaphragm removed.

Fig. 7 is a longitudinal section through the motor housing with the wiring terminal mounting also shown in section. This view is taken on a line substantially corresponding to line 7—7 of Fig. 2.

Fig. 8 is a transverse sectional view taken on a line substantially corresponding to line 8—8 of Fig. 7 and illustrates the method of making conduit connections and the accessibility of the grease cups.

Fig. 9 is a fragmentary sectional view taken on a line substantially corresponding to line 9—9 of Fig. 7 and illustrates the construction whereby the electrical terminals are easily accessible for wiring.

Referring to the drawings in detail, the embodiment illustrated comprises a substantially cylindrical housing 1 having at its rear end three bracket-like supporting lugs 2 having mounting holes 3 therein to receive suitable bolts or screws whereby the device may be mounted on any suitable support. The device is particularly adapted for marine use and therefore must be waterproof, and to accomplish this, a diaphragm 4 is mounted on the front end of the housing as illustrated in Fig. 4 and provided with suitable gaskets 5 which are preferably of rubber or other suitable waterproof material. A bell projector 6 is provided with a flange 7 which is secured to the front end of the housing 1 by means of suitable screws 8. The flange 7 clamps the diaphragm 4 between the gaskets 5 thereby providing a waterproof connection for protection of the motor.

A motor 9 is mounted within the housing and comprises a skeleton frame consisting of a front section 10 and a rear section 11. These sections support therein the usual field magnets 12 and armature 13 and are secured together by means of bolts 14 to provide a permanent motor assembly. The front portion 10 of the motor frame is provided with a pair of oppositely disposed outwardly extending ears 15 arranged to extend into recesses or pockets 16 in the housing 1 whereby the motor may be rigidly mounted by means of the mounting screws 17. At the rear end of the housing 1 an adjusting screw 18 is provided for adjusting the position of the armature 13. This adjusting screw is provided with a lock nut 19 whereby it may be readily secured in adjusted position. The motor frame 9 is provided at its rear end with a suitable bearing for the armature 13 and a ball 20 is supported in this armature bearing and arranged to be contacted by the adjusting screw 18 whereby the armature may be properly adjusted relative to the diaphragm 4.

The forward end of the armature shaft is provided with the usual ratchet 21 arranged to engage a lug 22 on the diaphragm to thereby vibrate the diaphragm when the motor is in operation. A spring 23 is supported in the motor frame 9 and arranged to normally retain the armature substantially in the position illustrated in Fig. 4, and the adjusting screw 18 may be adjusted against the tension of the spring 23 so that the diaphragm lug will be contacted by the ratchet in a desired manner to produce a desired tone when the motor is energized.

It will be noted that, as illustrated in Fig. 4, the motor mounting lugs 15 are oppositely disposed and extend into suitable pockets 16 at the front of the housing 1, and in order to remove the motor, it is only necessary to remove the projector and diaphragm and then remove the two screws 17. This provides an exceptionally convenient device in that the motor may easily be removed for repairs and a new motor inserted while the old one is being repaired.

Wiring terminals are provided at the bottom of the motor frame 9 as illustrated in Fig. 7. This arrangement comprises an insulating terminal base 24 on which are mounted suitable wiring terminals 25, which latter provide the motor connections and also the terminals for attaching the power circuit. The terminal base 24 is mounted on the motor frame 9 by means of suitable bushings 25a and mounting screws 26.

The main housing 1 is provided with a downwardly extending rectangular portion 27 having a cover plate 28 and gasket 29 arranged to close the opening thereof. The cover plate is secured in position by means of screws 30. The downwardly extending portion 27 of the housing is provided, adjacent its rear end, with threaded conduit connector openings 31. The openings 31 are provided with conduit stops 31a and are normally closed by means of suitable threaded plugs 32 on opposite sides of the housing and either or both of these plugs may be removed and suitable conduits may be connected therein.

The motor is provided with the usual wick oilers or grease cups 33 and these oilers are in longitudinal alignment with the terminal base 24, and it will be apparent, particularly from Fig. 5, that when the cover plate 28 is removed, both of the grease cups 33 as well as the terminals 25 are easily accessible so that the device may be easily lubricated and wired without dismounting or dismantling the device.

While only one embodiment has been illustrated, it will be apparent that modifications may be made without departing from the spirit of the invention. It is therefore desired that the invention be limited only by the prior art and the scope of the appended claims.

Having thus described this invention what is claimed and desired to be secured by Letters Patent is:

1. A weatherproof motor horn comprising a cup-like housing closed at one end and having an opening at its other end large enough to enable the insertion therethrough of a rotary electric motor unit, a rotary electric motor unit insertable and removable axially from the open end of said housing, a removable diaphragm and resonator extending across said opening and detachably secured to said housing for sealing said open end, said rotary motor comprising a rotary shaft and an actuator mounted on said shaft for actuating said diaphragm, an insulating terminal base mounted on the side of said motor intermediate the ends thereof, wiring terminals for the motor mounted on said base, a lubricating means for each end bearing of said motor and substantially in alignment with said terminal base, said housing having a laterally-extending open side portion to enclose said terminal base whereby said terminal base and said lubricating means are accessible through said open side portion, and a cover for sealing the opening, said motor being removable without removing said cover, said housing having an inlet for conductors whereby the ends of conductors inserted therein are accessible through said open side portion for wiring on said terminal base.

2. A weatherproof motor horn comprising a cup-like housing closed at one end and having an opening at its other end large enough to enable the insertion therethrough of a rotary electric motor unit, a rotary electric motor unit insertable and removable axially from the open end of said housing, a removable diaphragm and resonator extending across said opening and detachably secured to said housing for sealing said open end, said rotary motor comprising a rotary shaft and an actuator mounted on said shaft for actuating said diaphragm, an insulating terminal base mounted on the side of said motor intermediate the ends thereof, a lubricating means for each end bearing of said motor and substantially in alignment with said terminal base, said housing having a laterally-extending open side portion to enclose said terminal base whereby said terminal base and said lubricating means are accessible through said open side portion, said lateral extension having a side inlet for conductors whereby the ends of conductors inserted therein are accessible through said open side for wiring on said terminal base, and means comprising engaging portions on said motor unit and said housing for aligning said terminal base and said lubricating means with said open side.

3. A weatherproof horn comprising a substantially cylindrical cup-like housing closed at one end and having an opening at its other end large enough to enable the insertion therethrough of a rotary electric motor unit, a removable diaphragm closing the forward end of said housing, said housing having a pair of outwardly opening oppositely disposed recesses adjacent said diaphragm, a rotary electric motor unit in said housing, said motor comprising a rotary shaft and an actuator mounted on said shaft for actuating said diaphragm, a frame having oppositely disposed outwardly extending lugs extending into said recesses for radial alignment of said motor, securing means removable from the front of said housing for securing said motor means on the rear of said housing for mounting said housing on a support, a downwardly extending portion on said housing and having a bottom opening substantially the entire length of said casing, said motor having an insulating terminal base thereon, wiring terminals for said motor mounted on said base, and grease cups for each end bearing substantially in alignment with said base, said housing having an inlet for conductors whereby the ends of conductors inserted therein are accessible through said bottom opening for wiring on said terminal base, said motor being aligned relative to said bottom opening to expose said terminal base and said grease cups through said opening, and a cover for sealing said opening.

4. A weatherproof motor horn comprising a rotary motor having a rotary shaft, a rotor coaxial with said shaft for driving the shaft, and a cylindrical casing for said rotor, an insulating base mounted on one side of said casing, wiring terminals mounted on said base, a rotary diaphragm actuator mounted on said shaft and rotatable therewith, a housing for said casing, actuator, insulating base and wiring terminals, having a cylindrical portion receiving and embracing said casing and a lateral recess for receiving said base and wiring terminals, said housing being closed at one end and having an opening at its other end large enough to enable the insertion therethrough of said casing, insulating base and wiring terminals, means for securing said casing in said housing, a diaphragm actuated by said rotary diaphragm actuator extending across said opening and secured to said housing and a resonator mounted on said housing in front of said diaphragm, said housing having an opening in its side affording access to said lateral recess and to the wiring terminals and a detachable cover for said housing.

CLYDE VICTOR McBROOM.